Hermann Deutsch
INVENTOR.
BY Erich H Michaelis
ATTORNEY.

Patented Mar. 18, 1930

1,750,746

UNITED STATES PATENT OFFICE

HERMANN DEUTSCH, OF CHICAGO, ILLINOIS

MACHINE-TOOL WORK HOLDER

Application filed April 10, 1929. Serial No. 353,945.

The invention relates to machine tools and more specially to that part of the machine tool which supports the material to be machined.

The object of the invention is to provide a machine tool with one or more working tables adapted to be adjusted in a plurality of positions in relation to the head of such machine holding and supporting the cutting tool used to perform the actual work.

The further object of the invention is to provide a machine tool with one or more working tables adapted to support the material to be machined in a horizontal or vertical position as desired.

Other objects of the invention not specially mentioned may be easily understood and ascertained from the following description in connection with the drawings forming a part thereof. It is however to be noticed that the invention is not to be limited or restricted to the exact construction or formation, shown in the drawings and described in the specification, but that the invention is only to be limited by the scope of the claims appended hereto.

In the drawings illustrating a preferred embodiment of the invention and showing the lower part of a machine tool Fig. 1 is a side view of said lower part partly shown in section.

Figure 1:
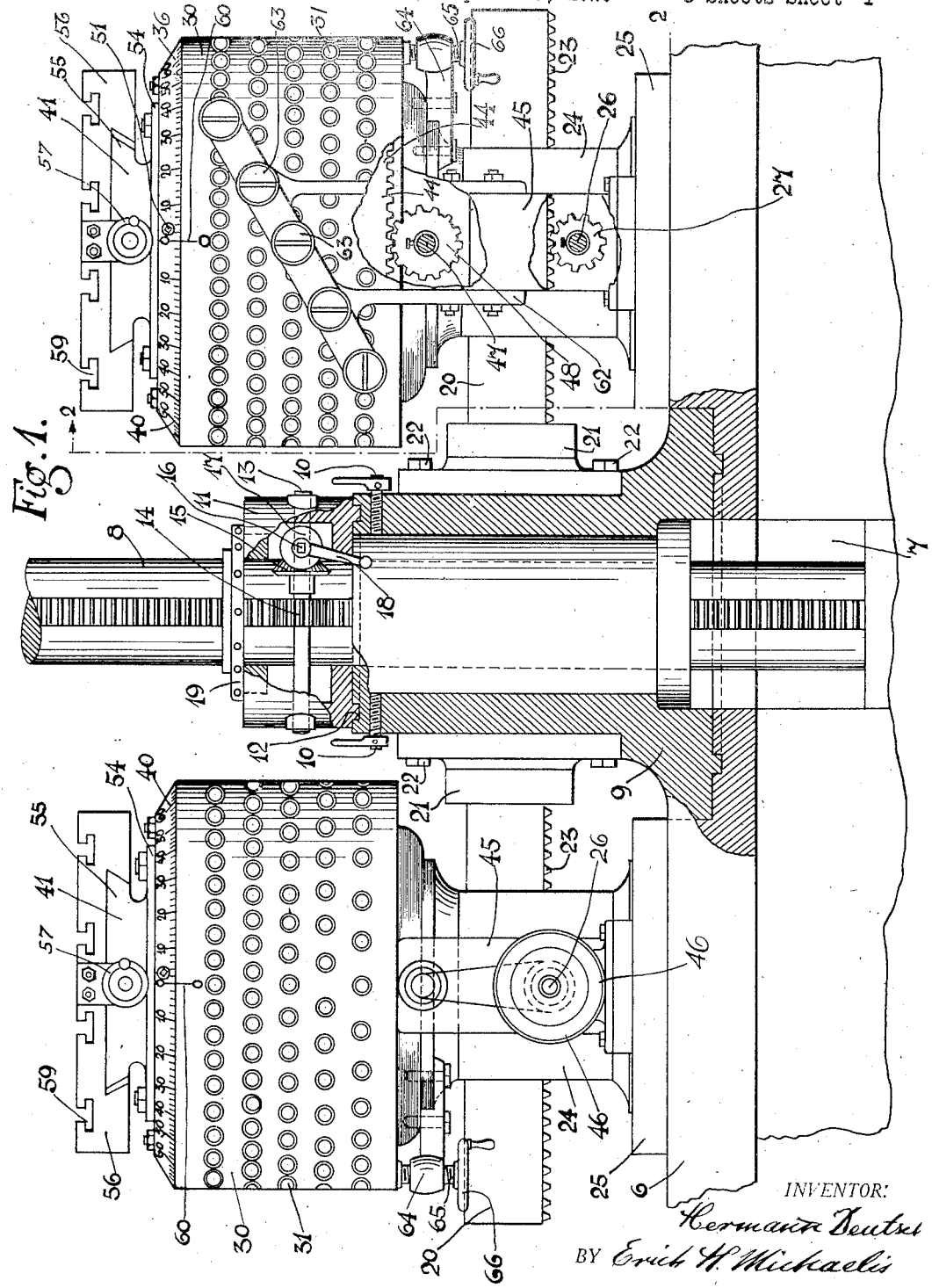

The machine tool according to the present invention has a base 6 provided with a central vertical bore into which a hollow cylinder 7 is inserted. This cylinder extends above the base and contains a vertical post adapted to support a working head of a machine tool such as a drill head or the like. In this post a rack is inserted extending lengthwise over the whole post. A supporting sleeve 9 surrounds the hollow cylinder and rests on the base 6. In order to secure said sleeve in the right position a circular groove is cut into the base concentric with the central bore and a circular key is formed on the bottom surface of the sleeve 9 and fits snugly into the circular groove. Adjacent the upper end of said sleeve a plurality of tapped holes are provided each adapted to receive a clamp bolt 10 by means of which the supporting sleeve 9 and all members connected thereto may be releasably fastened to the hollow cylinder 7. The upper faces of the sleeve 9 and the cylinder 7 are located in the same horizontal plane. A hollow member 11 has a central opening in its bottom adapted to receive the post 8 and a circular key 12 is formed on the lower face of said member and fits snugly into a circular groove cut into the top face of the sleeve 9. A shaft 13 is journalled in the walls of the hollow member 11 and extends crosswise thereof on one side of the post 8. A pinion 14 is rigidly mounted on said shaft and meshes with the rack in the post 8. A bevel gear 15 is also rigidly mounted on the cross shaft 13. Another shaft 16 extends at right angles to the first mentioned shaft into the hollow member and a second bevel gear 17 is rigidly mounted on said second shaft and meshes with the first bevel gear. The one end of the second shaft is located outside of the hollow member and is adapted to receive a crank 18. A cover 19 having a central opening to permit the post 8 to extend therethrough closes the top opening of the hollow member 11.

It is easy to see that the post 8 may be moved vertically by rotating the second shaft 16 by means of the crank 18. The post and anything supported thereby may be moved upwardly or downwardly as desired without influencing any part of the lower construction of the machine tool.

Figure 2:
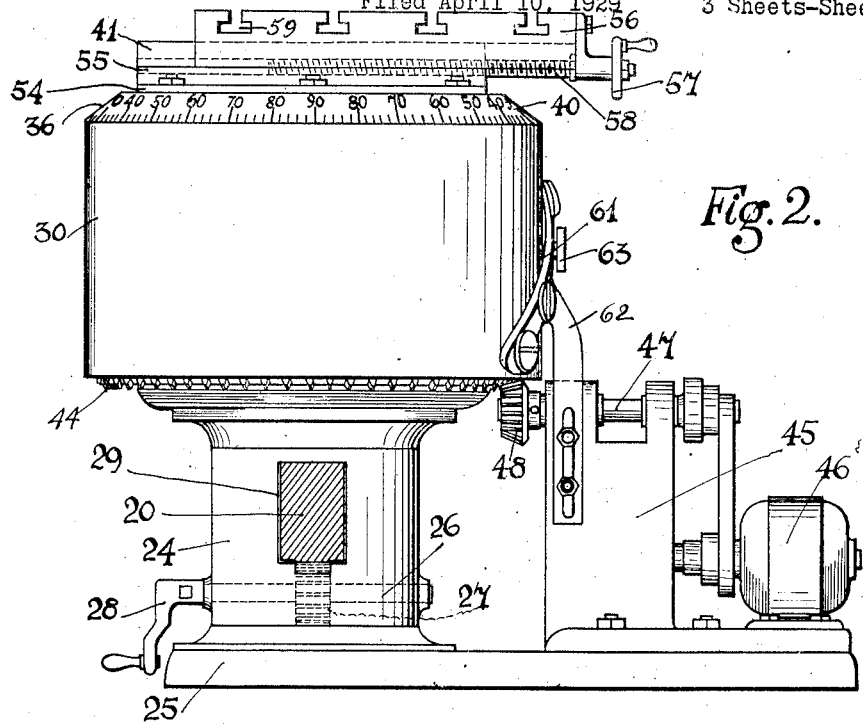
Fig. 2 is a side view of one of the working tables taken on line 2—2 in Fig. 1.
Figure 3:
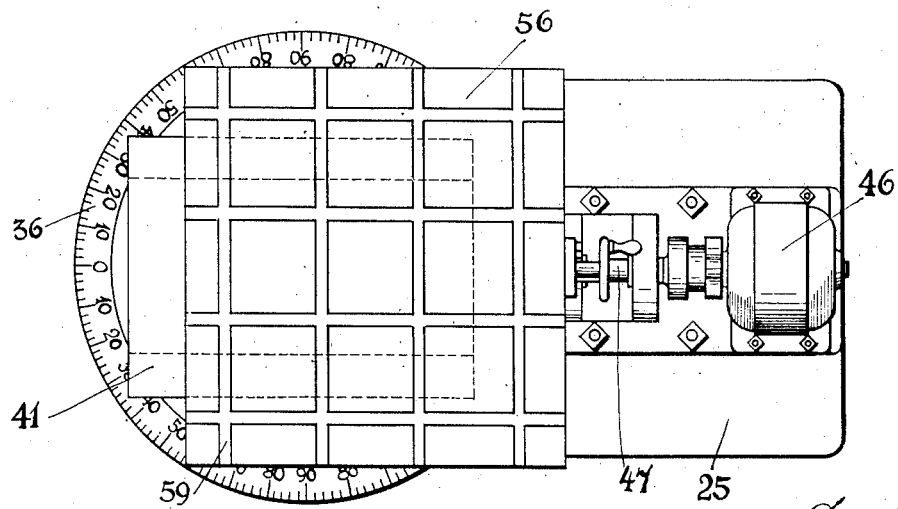
Fig. 3 is a top view of Fig. 2.

An arm 20 is fastened to a base 21 which in turn is fastened to the sleeve 9 by means of bolts 22 so that the arm extends horizontally from said sleeve as indicated in Fig. 2. Said arm 20 has preferably a rectangular cross section and on its lower face a rack 23 is formed.

Figure 4:
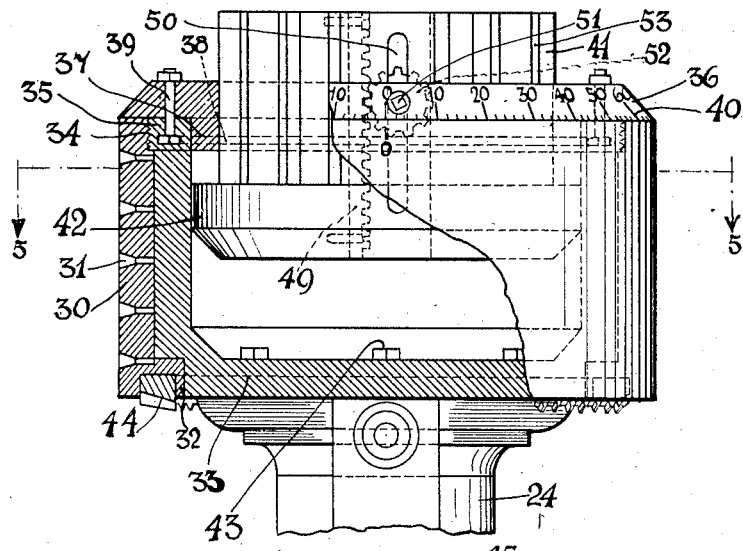
Fig. 4 is a detail drawing of one of the working tables, showing said table in side view and certain parts being broken away to facilitate the illustration of the construction of said table.

The top of the base 6 forms a glide way and a column 24 having a base plate 25 rests movably on said glide way. A shaft 26 extends diametrically through said column and inside of said column a pinion 27 is rigidly mounted on said shaft the one end of which extends beyond the column and is adapted to receive a crank 28. Above the pinion 27 the column is provided with a substantially rectangular hole 29 extending through the column 24 and adapted to receive the arm 20, so that the rack on said arm may be engaged by the pinion 27. In this manner the column 24, the base plate 25, and any member fastened to these two parts can be moved longitudinally of the arm by rotating the pinion 27 by means of the crank 28. A cylinder 30 is provided in its outer surface with a plurality of bores 31 for a purpose to be described later on. On its lower end said cylinder has a short inwardly extending flange 32. A cylindrical box like member 33 fits snugly into the cylinder 30 and the bottom of the box like member extends into the opening surrounded by the flange 32. A cylinder 30 is provided adjacent its upper end with an inside thread as indicated at 34 in Fig. 4 and a ring 35 may be screwed into the cylinder thereby holding the box like member securely inside the cylinder, but permitting rotary movement of said cylinder about the box like member.

A bevel ring 36 is provided at its inner rim with a vertically extending flange 37, adapted to be inserted into the ring 35. Said screw ring is provided with T-slot 38, adapted to receive bolts 39 and the bevel ring is provided with a plurality of holes permitting said bolts to extend therethrough.

In this manner the bevel ring may be fastened to the cylinder 30 and may be rotated therewith about the box like member. On the bevel of the ring 36 a scale 40 is provided.

Figure 5:
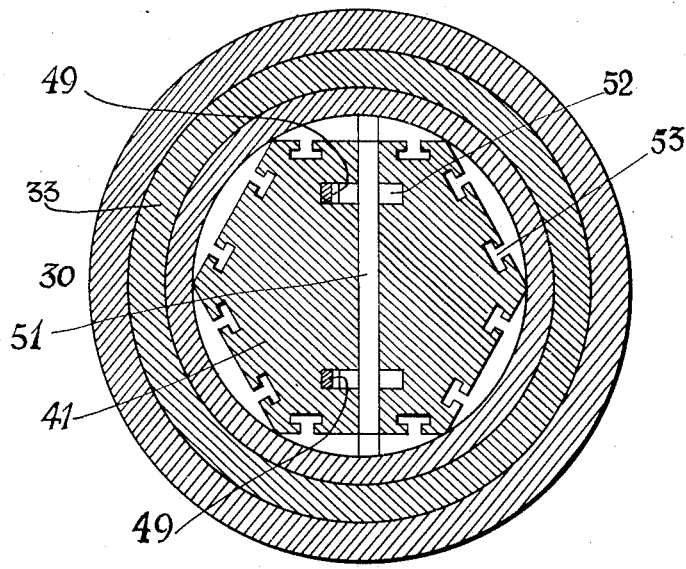
Fig. 5 is a sectional view of Fig. 4 taken on line 5—5 in Fig. 4.

A support 41 for the objects to be machined is carried by the construction described above in the following manner:

The support has as shown in Fig. 5 preferably the shape of a hexagon. The lower portion is formed circular and extends beyond the upper portion as indicated on 42 in Fig. 4. This circular portion fits snugly into the box like member 33 and serves as guide for the support when the same is adjusted vertically in a manner to be described later.

It is to be understood, that the support is to be inserted into the box like member, before the bevel ring is fastened to the screw ring since the flange 37 of said bevel ring forms a stop for the upward movement of the base 42 of the support 41. Before however the support 41 is put into position the box like member will be fastened to the top of the column 24 by means of bolts 43.

In the lower surface of the cylinder 30 a ring groove is cut and a circular rack 44 having bevel teeth is arranged in said groove.

A bracket 45 is fastened to the base plate 25 and carries a motor 46. In the bracket a shaft 47 is journalled carrying a bevel gear 48, which meshes with the circular rack 44 so, that the cylinder 30 and all parts connected therewith, including the support 41, which is also connected with said cylinder in a manner to be described later, may be rotated about the box like member 33 by means of the motor 46.

Inside the support a pair of racks 49 are arranged and through said support a vertical slot 50 extends at right angles to said racks. A shaft 51 extends through the bevel ring. A pair of spur gears 52 are rigidly mounted on said shaft, which may be rotated by means of a crank which is not shown. In this manner the support 41 may be raised or lowered inside the box like member 33. The sides of the hexagon portion of the support are provided with a plurality of T-slots 53, adapted to receive in a well known manner any material to be machined, so that this material is held in a vertical position.

The support 41 which is hollow is covered by means of a top plate 54, having at its upper surface guide ways 55, adapted to receive a clamp plate 56 of well known construction and adapted to be moved longitudinally of said guide ways by means of a hand wheel 57 and a spindle 58. The clamp plate is provided in the usual manner with a plurality of T-slots 59.

It is easy to see, that the working tables constructed and supported as described above, may be adjusted so, that the material to be machined, may be held practically in any desired angular position. The table may be rotated about the cylindrical member 7 and the supporting plate may be rotated by means of the motor, so that the T-slots may be adjusted to any desired position. This adjustment is controlled by means of the scale 40 co-operating with an indicator 60, arranged on the cylinder 30.

In order to hold the cylinder 30 in its adjusted position a plurality of spring pins 61 are provided. These pins are supported by a bracket 62, fastened to the bracket 45. Each spring pin has a head 63 to facilitate the manipulating of the spring pins, which are arranged so, that each pin may engage one of the bores in the cylinder, when said cylinder is in the desired position.

By raising or lowering the post 8 in the manner, described above, the distance between the working table and the working head of the machine tool may also be adjusted.

Adjacent the upper end of the column 24 a third bracket 64 is fastened carrying a vertical threaded spindle 65, on the lower end of which a hand wheel 66 is rigidly mounted. The upper end of the spindle is adapted to engage the cylinder 30 to prevent accidental movement thereof.

Having described my invention and how the same is to be performed I claim as new and desire to secure by Letters Patent:

1. In a device of the class described a base, a standard on said base, a sleeve resting on said base and surrounding the standard, a working table, a hollow column slidingly resting on said base, said working table being supported by said column, a rack on said sleeve and extending horizontally of said column having openings in its walls to permit said rack to extend therethrough, a pinion rotatably mounted in said column and adapted to engage said rack, and means for rotating said pinion.

2. In a device of the class described, a base, a standard on said base, a sleeve rotatably resting on said base and surrounding the standard, a hollow column slidingly resting on said base, a working table supported by said column, a rack rigidly fastened to said sleeve and extending horizontally thereof, said column having openings in its walls to permit said rack to extend through said column, a pinion mounted in said column and adapted to engage said rack, means rigidly connected with said column for rotating said pinion, and a clamping plate slidingly and removably mounted on said working table.

3. In a device of the class described a base, a standard on said base, a sleeve rotatably resting on said base and surrounding the standard, a hollow column slidingly resting on the base and having holes in its walls, a guide arm rigidly fastened to said sleeve and extending horizontally thereof and through the holes in the walls of the column, co-operating means on said guide arm and said column for moving said column toward and away from said standard, a cylindrical box like member resting on and fastened to the top of the column, a cylinder surrounding and rotatably supported by said box like member, and means for rotating said cylinder about said box like member.

4. In a device of the class described a base, a standard on said base, a sleeve rotatably resting on said base and surrounding said standard, a hollow column slidingly resting on said base and having openings in its walls, a rack rigidly fastened to said sleeve and extending horizontally thereof and through said openings, a pinion rotatably mounted in said column and adapted to engage said rack, means for rotating said pinion, a cylindrical box like member resting on and fastened to the top of the column, a cylinder surrounding said box like member, a ring removably fastened to the top of said cylinder resting on said box like member, and means for rotating said cylinder.

5. In a device of the class described a base, a standard on said base, a sleeve rotatably resting on said base and surrounding said standard, a hollow column slidingly resting on said base and having openings in its walls, a rack fastened to said sleeve and extending horizontally thereof and through said openings, a pinion rotatably mounted in said column and adapted to engage said rack, means for rotating said pinion, a cylindrical box like member resting on and fastened to the top of said column, a cylinder rotatably surrounding said box like member, a bevel ring provided with a scale and removably fastened to said cylinder, said ring slidingly resting on said box like member, a polygonal member slidingly mounted in said box like member, each side of said polygon being provided with T-slots, means for rotating said cylinder about the box like member, and co-operating means in said bevel ring and in said polygonal member for raising and lowering respectively said polygonal member in relation to said box like member.

6. In a device of the class described a base, a standard on said base, a sleeve rotatably resting on said base and surrounding said standard, a hollow column slidingly resting on said base and having openings in its walls, a rack fastened to and extending horizontally from said sleeve and adapted to penetrate said column, a pinion rotatably mounted in said column and adapted to engage said rack, means for rotating said pinion, a box like member resting on and fastened to the top of said column, a cylinder rotatably surrounding said box like member, a ring provided with a scale removably fastened to said cylinder and slidingly resting on said box like member, means for rotating said cylinder about said box like member, a polygonal member slidingly mounted in said box like member, each side of the polygon being provided with T-slots, co-operating means in said ring and said polygonal member for raising and lowering respectively said polygonal member, and a clamping plate slidingly and removably mounted on said polygonal member.

7. In a device of the class described a base, a standard on said base, a sleeve rotatably resting on said base and surrounding said standard, a hollow column slidingly resting on said base and having openings in its walls, a rack fastened to the sleeve and extending horizontally thereof and adapted to penetrate said column, a pinion rotatably mounted in said column and adapted to engage said rack, means for rotating said pinion, a box like member resting on and fastened to the top of the column, a cylinder rotatably surrounding said box like member, a ring provided with a scale removably fastened to said cylinder and slidingly resting on said box like member, means for rotating said cylinder about said box like member, a polygonal member slidingly mounted in said box like member, co-operating means in said ring and the polygonal member for raising and lowering respectively said polygonal member, each side of said polygonal member being provided with T-slots, a clamping plate having T-slots in its surface and slidingly and removably mounted on said polygonal member, the cylinder being provided with a plurality of radially extending bores, a bracket rigidly connected with said column, and means supported by said bracket for selectively engaging one of said bores.

8. In a device of the class described, a base, a standard on said base, a sleeve rotatably resting on said base and surrounding said standard, a hollow column slidingly resting on said base and having openings in its walls, a rack fastened to the sleeve and extending horizontally thereof and adapted to penetrate said column, a pinion rotatably mounted in said column and adapted to engage said rack, means for rotating said pinion, a box like member resting on and fastened to the top of the column, a cylinder rotatably surrounding said box like member, a ring provided with a scale removably fastened to said cylinder and slidingly resting on said box like member, means for rotating said cylinder about said box like member, a polygonal member slidingly mounted in said box like member, co-operating means in said ring and the polygonal member for raising and lowering respectively said polygonal member, each side of said polygonal member being provided with T-slots, a clamping plate having T-slots in its surface and slidingly and removably mounted on said polygonal member, the cylinder being provided with a plurality of radially extending bores, a bracket rigidly connected with said column, means slidingly supported by said bracket for selectively engaging said bores, and means fastened to said column for engaging the lower surface of the cylinder and for preventing accidental rotation of said cylinder.

9. In a device of the class described, a base, a standard on said base, a sleeve rotatably resting on said base and surrounding said standard, a hollow column slidingly resting on said base and having openings in its walls, a rack fastened to the sleeve and extending horizontally thereof and adapted to penetrate said column, a pinion rotatably mounted in said column and adapted to engage said rack, means for rotating said pinion, a box like member resting on and fastened to the top of the column, a cylinder rotatably surrounding said box like member, a ring provided with a scale removably fastened to said cylinder and slidingly resting on said box like member, means for rotating said cylinder about said box like member, a polygonal member slidingly mounted in said box like member, co-operating means in said ring and the polygonal member for raising and lowering respectively said polygonal member, each side of said polygonal member being provided with T-slots, a clamping plate having T-slots in its surface and slidingly and removably mounted on said polygonal member, the cylinder being provided with a plurality of radially extending bores, a bracket rigidly connected with said column, means slidingly supported by said bracket for selectively engaging one of said bores, said standard being hollow, a post slidingly arranged in said standard, and means for axially moving said post in relation to said standard.

In witness whereof I affix my signature.

HERMANN DEUTSCH.